Patented Oct. 25, 1927.

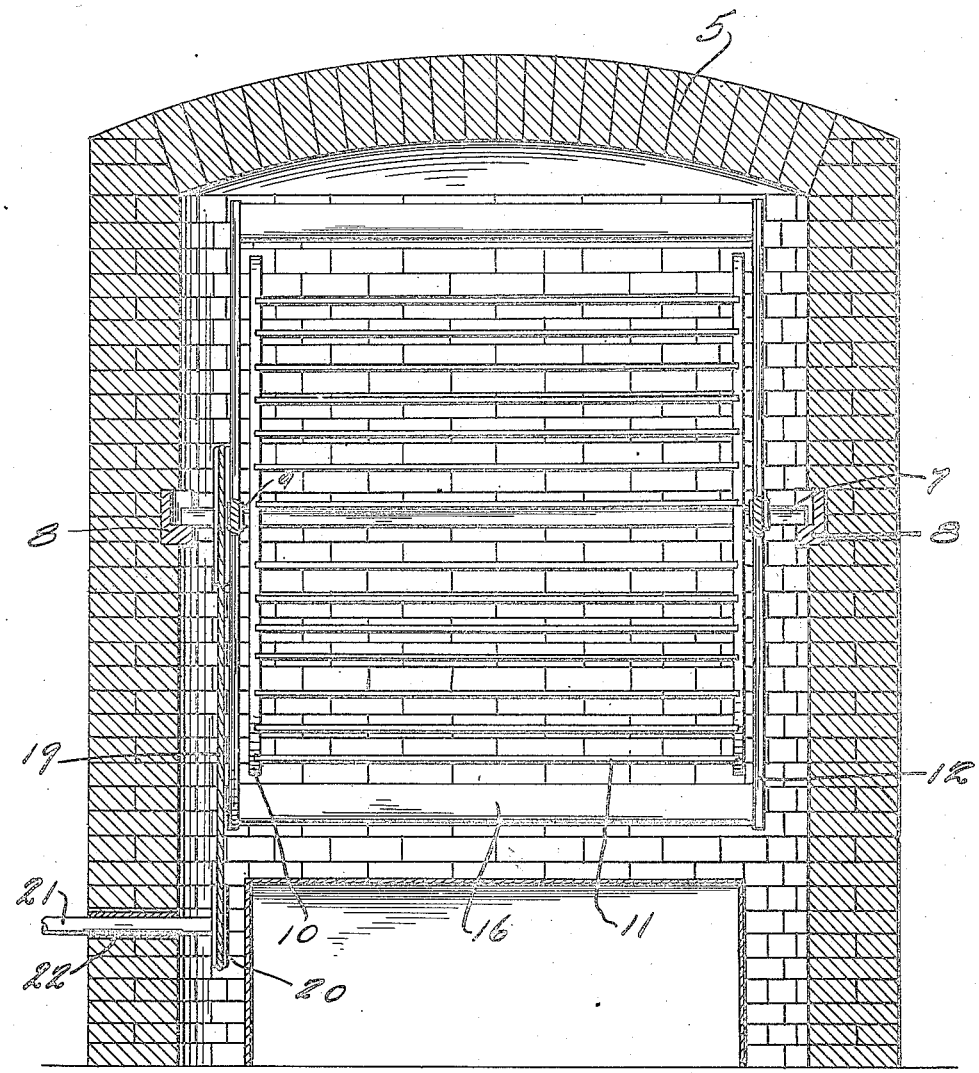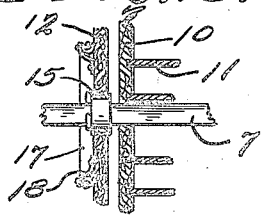

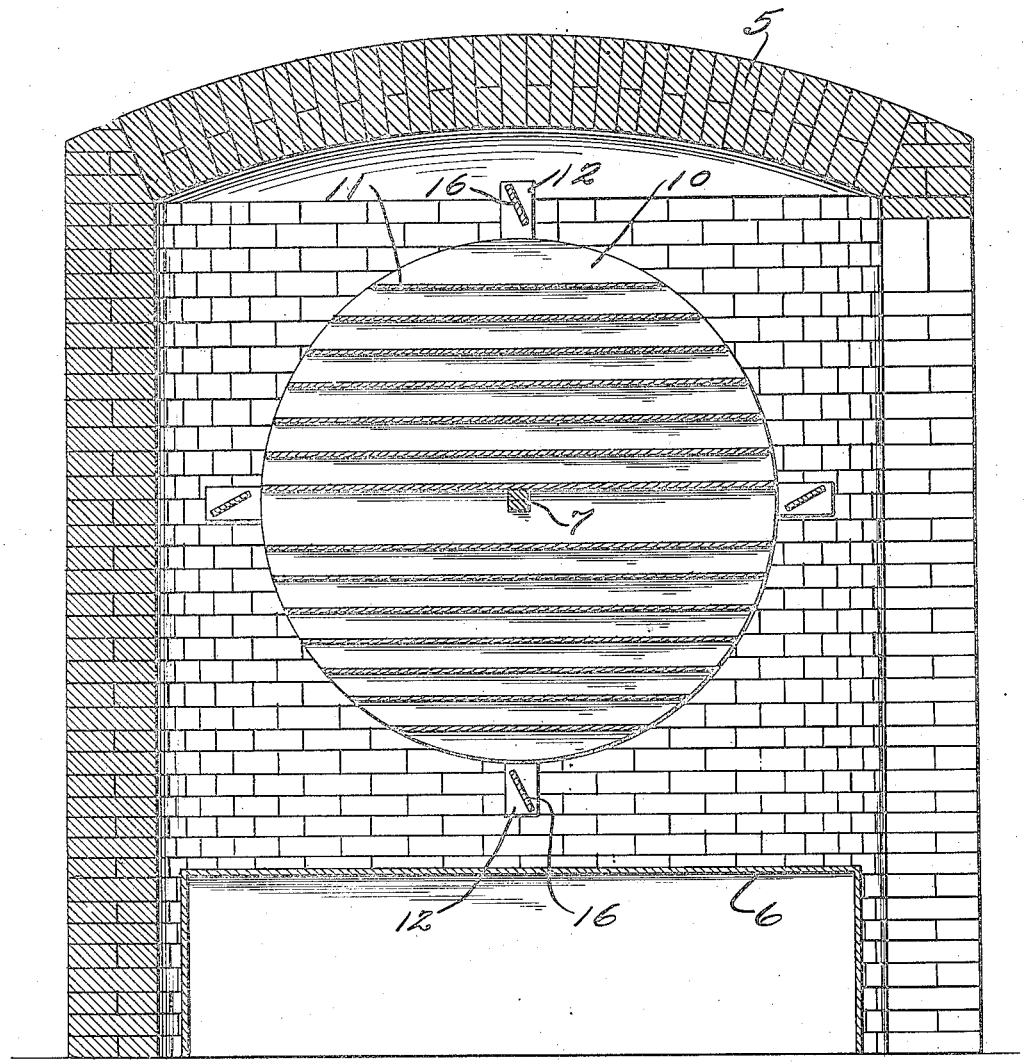
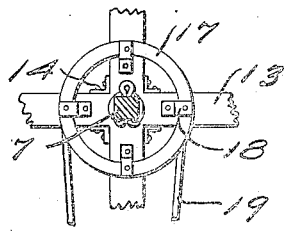

1,646,490

UNITED STATES PATENT OFFICE.

IRA M. PETERSIME, OF GETTYSBURG, OHIO.

OVEN AND DRIER.

Application filed December 20, 1923. Serial No. 681,814.

My invention relates to improvements in ovens or driers.

An important object of the invention is to provide an oven or drier equipped with agitating means adapted to circulate the warm air about the shelves or containers.

A further object of the invention is to provide a device of this character whereby the efficiency of the heating elements will be increased and produce quicker action on the commodity to be baked or dried.

A further object of the invention is to provide a device of this character which is comparatively simple yet durable of construction and efficient for the purpose intended.

Other objects and advantages of this invention will be apparent during the course of the following description.

In the accompanying drawings forming a part of this specification and in which like numerals are employed to designate like parts throughout the same:

Figure 1 is a longitudinal vertical sectional view through the housing, showing the construction of my invention, Figure 2 is a sectional view of one of the details, Figure 3 is a vertical transverse sectional view taken through the center of the device, and Figure 4 is a detailed view of the rotating means.

In the drawings, wherein for the purpose of illustration is shown the preferred embodiment of my invention, the numeral 5 designates the oven or drier housing which is shown as constructed of brick, but may be made of suitable material for the purpose in which the invention is to be used, as the invention may be used in an oven and also applied to a drier. Within the lower portion of the housing 5, I have shown a heating chamber 6, the heating means not being illustrated as the means employed would vary with the application of the device, several modes of heating being conceivable, such as the conventional type of grate, electrical heating means, or the like. A crossbar 7 is adapted to extend across the housing and securely held in position by a pair of brackets 8, the crossbar being square in cross section with the exception of a pair of collars 9, which may be formed integral with said crossbar or secured thereon to act as bearings.

A pair of supporting members 10 are preferably circular in form and are secured to the cross shaft 7 in a stationary manner, said supporting members carrying a plurality of shelves 11 therebetween. It is obvious that numerous pans with dough to be baked or articles to be dried may be placed upon the shelves without danger of becoming dislodged.

The numeral 12 generally designates the agitating means, which consists of cross arms 13, of which four are shown in the drawings, although it is to be understood that the number employed will vary with the use of the device. The cross arms 13 are joined by means of brackets 14, or the like, and have an opening in the center thereof which is adapted to receive a collar 15, which is to be positioned upon the circular portion of the crossbar 7 and adapted to rotate thereon. A plurality of blades 16 are secured to the extremities of the crossarms and carried by them in a rotatable manner.

For the purpose of rotating the agitating means, a pulley 17 is secured to the cross arms 13 by a plurality of brackets 18, said sprocket adapted to engage a cable or belt 19. The lower portion of the cable 19 is adapted to fit over a second pulley 20 which is secured to and rotated by a shaft 21, said shaft being provided with a bearing 22. It is contemplated that the shaft 21 will be driven by an electric motor, gas engine, or the like, the power required depending upon the type of device employed.

In operation, when used as an oven, the pans containing the dough are placed upon the shelves 11 and the temperature of the oven raised to the desired degree. The agitating means are then set in motion, the motor or power supplying means rotating the shaft 21 and causing movement of the transmission cable 19 which in turn transmits rotary motion to the pulley 17, secured to the cross arms 13, and rotates the said cross arms and blades carried thereby. The movement of the blades about the shelves will cause a moving current of air to circulate therethrough. The blades may be set at whatever angle desired, thus causing the warm air to be blown directly upon the commodity to be baked if so desired.

In using the device as a drier, it is obvious that several of the shelves may be removed in the event that the objects to be dried are of unusually large size, the agitator being rotated as previously described, thereby greatly increasing the drying power of the device. It is obvious that the objects are more thoroughly dried in this manner and a great saving in time is created thereby.

It is to be understood that the form of my invention herewith shown and described is to be taken as a preferred example of the same, and that various changes in the shape, size, and arrangement of parts may be resorted to without departing from the spirit of the invention, or the scope of the subjoined claims.

Having thus described my invention, I claim:

1. A device of the character described comprising a housing, a drum like container positioned within said housing, agitating means adapted to rotate about said container, and means for rotating said agitator.

2. A device of the character described comprising a heated housing, a pair of shelf-supporting disks, means for supporting said disks, a plurality of shelves positioned between said shelf-supporting disks, agitating means adapted to rotate about the shelves, and means to rotate the said agitator.

3. A device of the character described comprising a housing, a heating element, a pair of shelf-supporting plates, a crossbar adapted to support the said plates, a plurality of shelves secured to the said plates, an agitator composed of a plurality of cross arms, a plurality of blades supported by the cross arms, a pulley secured to the central portion of the cross arms, and means for rotating the pulley and agitating means.

4. In combination with a housing and heating means, of a pair of shelf-retaining plates, a crossbar supporting said plates, a plurality of shelves secured between said plates, an agitator comprising a plurality of cross arms, a plurality of blades secured to the extremities of the cross arms, a pulley secured at the center portion of the cross arms, a pulley secured to the lower portion of the housing, a belt adapted to connect the pulleys, and means whereby the agitating means will be rotated about the shelves.

5. In combination with a housing and heating means, of a pair of circular plates, a crossbar adapted to support said plates, a plurality of shelves secured between the plates, an agitator comprising a plurality of cross arms, bearing means formed in the central portion of the cross arms, a plurality of blades secured to the extremities of the cross arms, a pulley secured to the central portion of the cross arms, and means for actuating said pulley and agitator.

6. An oven and drier including a heated housing equipped with article supports, and means movable around said supports to maintain a uniform temperature around the supports.

In testimony whereof, I have affixed my signature.

IRA M. PETERSIME.